Figure 1:
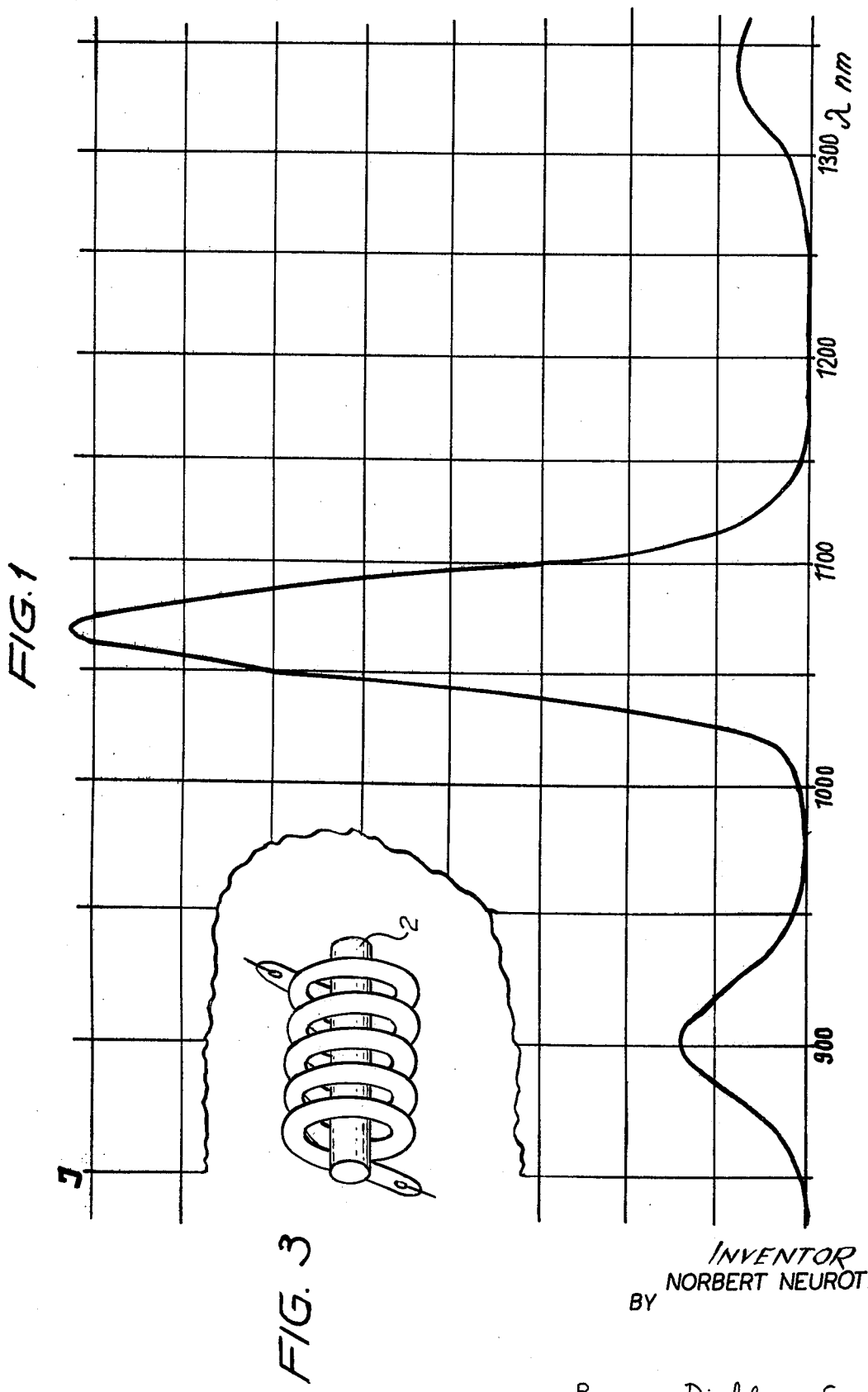

United States Patent [19]

Neuroth

[11] 3,928,229

[45] Dec. 23, 1975

[54] TRANSPARENT GLASS-CERAMIC LASERABLE ARTICLES CONTAINING NEODYMIUM

[75] Inventor: Norbert Neuroth, Mainz-Mombach, Germany

[73] Assignee: Janaer Glaswerk Schott & Gen., Mainz, Germany

[22] Filed: May 8, 1973

[21] Appl. No.: 358,224

Related U.S. Application Data

[63] Continuation of Ser. No. 86,010, Nov. 2, 1970, abandoned.

[30] Foreign Application Priority Data

Nov. 3, 1969 Germany............................ 1955174

[52] U.S. Cl. .............. 252/301.6 P; 252/301.4 P; 252/301.4 F; 252/301.6 F; 252/301.6 R; 252/301.4 R; 156/47 Q; 156/39.6; 156/39.7; 156/52

[51] Int. Cl.² .................. C09K 11/08; C03C 3/22; C03C 3/04; C09K 11/10

[58] Field of Search .......... 106/52, 39.6, 39.7, 39.8, 106/47 Q; 252/301.4 F, 301.4 R, 301.4 D, 301.6 P, 301.6 F, 301.6 R

[56] References Cited

UNITED STATES PATENTS

| 3,504,819 | 4/1970 | Veres................................. 106/39.6 |
| 3,535,266 | 10/1970 | Lee, Jr. ......................... 252/301.4 F |
| 3,597,179 | 8/1971 | Simmons............................. 106/39.8 |
| 3,617,317 | 11/1971 | Sack et al. .......................... 106/39.8 |
| 3,642,504 | 2/1972 | Petzold et al. ...................... 106/39.8 |
| 3,725,811 | 4/1973 | Murphy......................... 252/301.4 F |
| 3,788,865 | 1/1974 | Babcock et al. .................... 106/39.7 |

*Primary Examiner*—Patrick P. Garvin
*Assistant Examiner*—Mark Bell
*Attorney, Agent, or Firm*—Burgess, Dinklage & Sprung

[57] ABSTRACT

Glass ceramics capable of luminescence or induced emission. An activator, e.g. neodymium, is used to impart said properties. The glasses can be used in lasers and masers.

10 Claims, 3 Drawing Figures

TRANSPARENT GLASS-CERAMIC LASERABLE ARTICLES CONTAINING NEODYMIUM

This is a continuation of application Ser. No. 86,010 filed Nov. 2, 1970, now abandoned.

A large number of crystalline materials and glasses are known which luminesce and can be excited to induced emission due to the incorporation of one or more types of activation ions. The crystals have certain physical properties which are determined by the type of crystal involved. In the case of glasses, the characteristics can be constantly varied by the systematic variation of their chemical composition, so as to approximate desired values.

A new group of solid materials is represented by substances referred to as glass ceramics. The production of a glass ceramic commences with production of glasses of certain compositions, which in a second step of the process are transformed to glassy-crystalline bodies by heat treatment. This heterogeneous structure results in special characteristics. For example, glass ceramics can be made whose thermal expansion is virtually zero. Such materials are extremely resistant to thermal shock.

It has now been found that glass ceramics are also suitable as host materials for activation ions. The activating ions can be used in small amounts effective to impart the stated properties, e.g. 0.1-10, or 1-8, preferably 1-5 wt. %, calculated as an oxide. If, for example, ions of the rare earth group are incorporated into them, they can be excited to luminescence. For example, it has been found that neodymium ions can be incorporated into a transparent glass ceramic of extremely low thermal expansion and excited to luminescence. Production of the glass ceramics suitable as hosts for the activators is described in U.S. Pat. application Ser. No. 716,316, filed Mar. 27, 1968, now abandoned; Ser. No. 740,317, filed June 26, 1968, now U.S. Pat. No. 3,617,317; Ser. No. 743,580, filed July 1, 1968, now U.S. Pat. No. 3,642,504.

Ions of the following elements are suitable as activators. Chromium, manganese, nickel, copper, cerium, praseodymium, neodymium, samarium, europium, gadolinium, terbium, dysprosium, holmium, erbium, thulium, ytterbium or uranium ions, a mixture hereof.

In FIG. 1 there is shown the spectral curve of the luminescence emission J. The stronger emission is at 1,060 nm, and two weaker emission bands occur at 900 nm and 1,330 nm.

Figure 2:
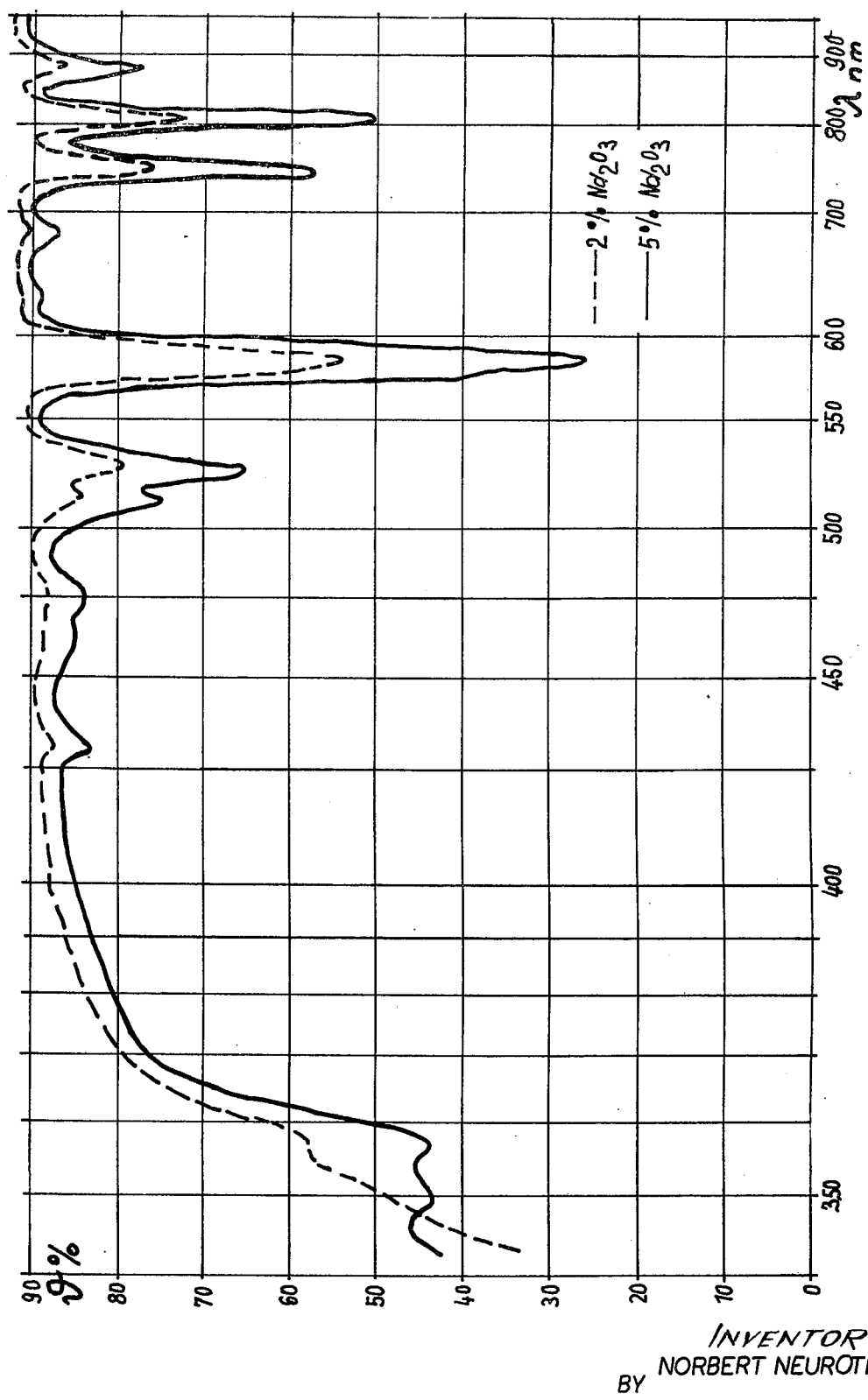

In FIG. 2 there are shown the absorption spectre of two glass ceramics containing neodymium. Curve $a$ is the curve for a glass ceramic containing 2% neodymium oxide, and curve $b$ represents a glass ceramic containing 5% neodymium oxide.

FIG. 3 shows a device for generation of ultra high frequency energy emission, in the form of a laser or maser outfitted with an activated glass ceramic 2, as a molecular oscillator.

Table 1 and Table 2 set forth compositions and the most important properties of luminescent glass ceramics according to the invention. Ranges are given in Table 1; specific compositions in Table 2. The luminescence decay time in the first three glass ceramics of Table 2 is greater than 200 microseconds, a value which is desired in laser design. The thermal expansion is lower than that of quartz glass, and is very important in withstanding the great thermal shocks which the laser rod undergoes when excited by the powerful flash lamps.

The production of these luminescent glass ceramics is performed by the processes described in the above-cited patent applications, the activator ions being incorporated into the glass batch in the form of the oxides as the other constituents of the glass are incorporated.

Table 1

|  | Broad Range wt.% | Preferred Range wt.% |
| --- | --- | --- |
| $SiO_2$ | 50 – 70 | 60 – 70 |
| $P_2O_5$ | 0 – 10 | 0 – 6 |
| $Al_2O_3$ | 15 – 30 | 16 – 20 |
| $Li_2O$ | 2 – 8 | 2 – 4 |
| $Na_2O$ | 0.2 – 2 | 0.2 – 2 |
| MgO | 0 – 3 | 0.5 – 3 |
| CaO | 0 – 3 | 0 – 1 |
| ZnO | 0.5 – 3 | 0.5 – 3 |
| $TiO_3$ | 1.0 – 3 | 1.0 – 3 |
| $ZrO_2$ | 1.0 – 3 | 1.0 – 3 |
| $As_2O_3$ | 0 – 2 | 0 – 2 |
| $Sb_2O_3$ | 0 – 2 | 0 – 2 |
| $Nd_2O_3$ | 1 – 8 | 2 – 5 |
| MgO + CaO | 0.5 – 3 | 0.5 – 2 |
| $As_2O_3 + Sb_2O_3$ | 0.0 – 2.0 | 0.3 – 2 |
| Intensity of luminescence of the 1060 nm bands (relative values) | 3 – 35 | 3 – 35 |
| Luminescence decay time (microseconds) | >25 or 25 – 400 | >200 or 200 – 350 |
| Thermal expansion 0.2 – 5 (20 to 30°C) . $10^7$/°C | | 0.2 – 5 |
| Sp. Gravity | 2.25 – 2.75 | 2.45 – 2.6 |

Table 2

Compositions in wt.% and characteritistics of neodymium-activated glass ceramic

|  | 1 | 2 | 3 | 4 |
| --- | --- | --- | --- | --- |
| $SiO_2$ | 67.0 | 65.0 | 64.0 | 54.2 |
| $P_2O_5$ | — | — | 5.0 | 7.7 |
| $Al_2O_3$ | 18.5 | 17.9 | 19.0 | 24.7 |
| $Li_2O$ | 2.8 | 2.7 | 3.2 | 3.7 |
| $Na_2O$ | 0.7 | 0.7 | 0.5 | 0.5 |
| MgO | 1.0 | 1.0 | 0.7 | 1.0 |
| CaO | 0.8 | 0.7 | — | — |
| ZnO | 2.9 | 2.9 | 0.7 | 1.4 |
| $TiO_2$ | 1.5 | 1.4 | 2.6 | 2.2 |
| $ZrO_2$ | 1.8 | 1.7 | 1.8 | 1.9 |
| $As_2O_3$ | — | — | 0.5 | 0.7 |
| $Sb_2O_3$ | 1.0 | 1.0 | — | — |
| $Nd_2O_3$ | 2.0 | 5.0 | 2.0 | 2.0 |
| Intensity of Luminescence of the 1060 nm bands (relative values) | 30 | 24 | 4 | 4 |
| Luminescence decay time (microseconds) | 330 | 220 | 240 | <50 |
| Thermal expansion (20 to 30°) . $10^7$/°C | 2.4 | — | 4.0 | 0.5 |
| Spec. Gravity | 2.51 | 2.56 | 2.51 | 2.54 |

In the Table 1 compositions, neodymium can be replaced by the same molar amount of any of the ions mentioned above as being suitable as activators; mixtures of the activators can be used.

EXAMPLE

In order to produce 100 kg of the neodymium-doped glass ceramic according to Example 3 of the table, the following are thoroughly blended for 30 minutes in a mixer:

| | |
| --- | --- |
| 63.1 kg | silicon dioxide |
| 23.6 kg | aluminum hydroxide |
| 7.9 kg | lithium carbonate |
| 0.7 kg | zinc oxide |
| 1.5 kg | magnesium carbonate |

-continued

| 8.6 kg | aluminum orthophosphate |
| 0.5 kg | arsenic oxide |
| 1.4 kg | sodium nitrate |
| 2.6 kg | titanium oxide |
| 2.7 kg | zirconium silicate |
| 2.0 kg | neodymium oxide |

The mixture of raw materials is melted in a fireclay furnace at 1600°C in 12 hours and refined for 20 hours at 1,620°C. The melt is poured into the desired molds and annealed from 680°C down. In order to transform the glass without deformation to a transparent glass-crystal mixture, the glass is heated at a rate of 2°C per minute to 700°C, held at this temperature for 30 minutes, then heated, again at a rate of 2°C per minute, to 810°C and kept at this temperature for 90 minutes. After the ceramization, the object is cooled to room temperature.

What is claimed is:

1. A laserable article consisting of transparent glass ceramic as host material containing activating ions rendering the article capable of induced emission, the activating ions being neodymium ions in amount of 0.1–10 wt.-% calculated on the oxide.

2. Article according to claim 1, containing 1–8 wt% neodymium calculated on the oxide.

3. Article according to claim 1, containing 1–5 wt% neodymium calculated on the oxide.

4. A laserable article consisting essentially of transparent $Li_2O$-$Al_2O_3$-$SiO_2$ glass ceramic as host material containing neodymium ions rendering the article capable of induced emission, the amount of neodymium being 0.1–10 wt.% calculated on the oxide.

5. A laserable article consisting essentially of transparent glass ceramic as host material containing neodymium ions rendering the article capable of induced emission, the composition of the glass in weight % being:

| | |
|---|---|
| $SiO_2$ | 50 – 70 |
| $P_2O_5$ | 0 – 10 |
| $Al_2O_3$ | 15 – 30 |
| $Li_2O$ | 2 – 8 |
| $Na_2O$ | .02 – 2 |
| MgO | 0 – 3 |
| CaO | 0 – 3 |
| ZnO | 0.5 – 3 |
| $TiO_2$ | 1.0 – 3 |

-continued

| | |
|---|---|
| $ZrO_2$ | 1.0 – 3 |
| $As_2O_3$ | 0 – 2 |
| $Sb_2O_3$ | 0 – 2 |
| $Nd_2O_3$ | 1 – 8 |
| MgO + CaO | 0.5 – 3 |
| $As_2O_3 + Sb_2O_3$ | 0.0 – 2.0. |

6. Article according to claim 5, having:

| | |
|---|---|
| Intensity of luminescence of the 1060 nm bands (relative values) | 3 – 35 |
| Luminescence decay time (microseconds) | 25 |
| Thermal expansion 20 to 30°C, × $10^7$/°C | 0.2 – 5 |
| Sp. Gravity | 2.25 – 2.75 |

7. Article according to claim 5, the thermal expansion at 20°–30°C, × $10^7$/°C, being 0.2 – 5.

8. Article according to claim 5, consisting essentially of the following composition in wt.%

| | |
|---|---|
| $SiO_2$ | 60 – 70 |
| $P_2O_5$ | 0 – 6 |
| $Al_2O_3$ | 16 – 20 |
| $Li_2O$ | 2 – 4 |
| $Na_2O$ | 0.2 – 2 |
| MgO | 0.5 – 3 |
| CaO | 0 – 1 |
| ZnO | 0.5 – 3 |
| $TiO_2$ | 1.0 – 3 |
| $ZrO_2$ | 1.0 – 3 |
| $As_2O_3$ | 0 – 2 |
| $Sb_2O_3$ | 0 – 2 |
| $Nd_2O_3$ | 2 – 5 |
| MgO + CaO | 0.5 – 2 |
| $As_2O_3 + Sb_2O_3$ | 0.3 – 2 |

9. Article according to claim 8, having:

| | |
|---|---|
| Intensity of luminescence of the 1060 nm bands (relative values) | 3 – 35 |
| Luminescence decay time (microseconds) | 200 |
| Thermal expansion 20 to 30°C. $10^7$/°C | 0.2 – 5 |
| Sp. Gravity | 2.45 – 2.6 |

10. Article according to claim 8, the thermal expansion coefficient at 20–30°C, × $10^7$/°C, being 0.2 – 5.

* * * * *

UNITED STATES PATENT OFFICE
CERTIFICATE OF CORRECTION

PATENT NO. : 3,928,229
DATED : December 23, 1975
INVENTOR(S) : Neuroth Norbert

It is certified that error appears in the above-identified patent and that said Letters Patent are hereby corrected as shown below:

Column 2, line 18, (Table 1), change "$TiO_3$" to --$TiO_2$--.

Column 3, line 43, change ".02-2" to --0.2-2--.
Column 4, line 13, change "25" to -- >25--.
Column 4, line 39, change "200" to -->200--.

Signed and Sealed this

Eighth Day of March 1977

[SEAL]

Attest:

RUTH C. MASON
Attesting Officer

C. MARSHALL DANN
Commissioner of Patents and Trademarks